United States Patent
Hayasaka et al.

(10) Patent No.: US 12,106,296 B2
(45) Date of Patent: Oct. 1, 2024

(54) REWARD CALCULATION SYSTEM, REWARD CALCULATION METHOD, AND INFORMATION STORAGE MEDIUM

(71) Applicant: RAKUTEN GROUP, INC., Tokyo (JP)

(72) Inventors: Daigo Hayasaka, Tokyo (JP); Megha Srivastava, Tokyo (JP); Aleksandr Bzikadze, Tokyo (JP); Louise Jones, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 18/361,940

(22) Filed: Jul. 31, 2023

(65) Prior Publication Data
US 2024/0070657 A1    Feb. 29, 2024

Related U.S. Application Data

(60) Provisional application No. 63/400,735, filed on Aug. 24, 2022.

(51) Int. Cl.
*G06Q 30/02*    (2023.01)
*G06Q 20/32*    (2012.01)
(Continued)

(52) U.S. Cl.
CPC ....... *G06Q 20/387* (2013.01); *G06Q 20/3274* (2013.01); *G06Q 30/0224* (2013.01); *G06Q 30/0238* (2013.01); *G06Q 30/04* (2013.01)

(58) Field of Classification Search
CPC ............. G06Q 20/387; G06Q 20/3274; G06Q 30/0224; G06Q 30/0238; G06Q 30/04
See application file for complete search history.

(56) References Cited

U.S. PATENT DOCUMENTS

| 2007/0112632 A1* | 5/2007 | Voltmer | G06Q 30/0232 705/14.29 |
| 2012/0072280 A1* | 3/2012 | Lin | G06Q 30/0246 705/14.45 |

(Continued)

FOREIGN PATENT DOCUMENTS

| JP | 2017-146634 A | 8/2017 |
| JP | 2021-196663 A | 12/2021 |

OTHER PUBLICATIONS

"Automated Receipt Scanning and Clearing for Loyalty Programs" (Published May 2, 2022 at https://www.klippa.com/en/blog/information/receipt-scanning-for-loyalty/ ) (Year: 2022).*

(Continued)

*Primary Examiner* — James M Detweiler
(74) *Attorney, Agent, or Firm* — HEA LAW PLLC

(57) ABSTRACT

Provided is a reward calculation system including at least one processor configured to acquire payment information about a payment of a transaction object traded on a user terminal used by a user; acquire a user attribute of the user; calculate an estimated reward potentially provided to the user terminal, based on at least the payment information and the user attribute; cause the user terminal to display the estimated reward; and acquire, after the estimated reward is displayed, receipt information included in a receipt image in which a receipt issued for a transaction of the transaction object is displayed.

12 Claims, 14 Drawing Sheets

(51) Int. Cl.
*G06Q 20/38* (2012.01)
*G06Q 30/0207* (2023.01)
*G06Q 30/0238* (2023.01)
*G06Q 30/04* (2012.01)

(56) References Cited

U.S. PATENT DOCUMENTS

| | | | | |
|---|---|---|---|---|
| 2013/0132178 A1* | 5/2013 | Masuko | ............ | G06Q 30/0217 705/14.19 |
| 2014/0310089 A1* | 10/2014 | Cullen | ............... | G06Q 30/0233 705/14.33 |
| 2014/0324563 A1* | 10/2014 | Wencel, II | ......... | G06Q 30/0226 705/14.27 |
| 2017/0018011 A1* | 1/2017 | Nakaoka | ............ | G06Q 30/0251 |
| 2020/0134655 A1* | 4/2020 | Matsuo | .............. | G06Q 30/0226 |
| 2021/0192496 A1* | 6/2021 | Gregovic | ............... | G06N 20/20 |

OTHER PUBLICATIONS

"Payment can be switched to "PayPay pay-later" on the top screen of PayPay application", [online], PayPay Corporation, Mar. 11, 2022, [retrieved on Sep. 22, 2023], Internet, <URL:https://paypay.ne.jp/notice/20220311/01/>, pp. 1-5 (see a partial translation of the Office Action for Concise explanation of relevance).

"Notice of change in bonus granting date of campaign", [online], PayPay Corporation, Nov. 25, 2019, [retrieved on Sep. 22, 2023], Internet, <URL:https://paypay.ne.jp/notice/20191125/01/>, pp. 1-5 (see a partial translation of the Office Action for Concise explanation of relevance).

Office Action of Oct. 10, 2023, for corresponding JP Patent Application No. 2022-154769 with a partial translation, pp. 1-5.

* cited by examiner

| USER ID | NAME | ADDRESS | AGE | REMAINING POINTS | ·· |
|---|---|---|---|---|---|
| U001 | ○KO SUZUKI | TOKYO | FEMALE | 1200 | ·· |
| U002 | ○O SATO | CHIBA PREFECTURE | MALE | 550 | ·· |
| U003 | ○TA YAMADA | CHIBA PREFECTURE | MALE | 0 | ·· |
| U004 | ○ TAKAHASHI | KANAGAWA PREFECTURE | FEMALE | 1080 | ·· |
| : | : | : | : | : | |

FIG.3B

| PAYMENT DATE | STORE ID | STORE NAME | PAYMENT AMOUNT (YEN) | RECEIPT TRANSMISSION HISTORY |
|---|---|---|---|---|
| 2022/7/6 | S003 | A STORE | 590 | TRANSMITTED |
| 2022/7/9 | S005 | B MARKET | 2211 | TRANSMITTED |
| 2022/7/9 | S006 | C STORE | 498 | NOT TRANSMITTED |
| 2022/7/22 | S005 | B MARKET | 1544 | TRANSMITTED |
| .. | | | .. | .. |

| | COMMERCIAL PRODUCT ATTRIBUTE X | COMMERCIAL PRODUCT ATTRIBUTE Y | COMMERCIAL PRODUCT ATTRIBUTE Z | ... |
|---|---|---|---|---|
| COMMERCIAL PRODUCT ATTRIBUTE X | 1 | 1.3 | 1.3 | ... |
| COMMERCIAL PRODUCT ATTRIBUTE Y | 1.3 | 1 | 1.5 | ... |
| COMMERCIAL PRODUCT ATTRIBUTE Z | 1.3 | 1.5 | 1.2 | ... |
| SERVICE ATTRIBUTE XX | 1 | 1 | 1.8 | ... |
| ... | | | | |

REWARD CALCULATION SYSTEM, REWARD CALCULATION METHOD, AND INFORMATION STORAGE MEDIUM

CROSS-REFERENCE TO RELATED APPLICATION

The present application claims priority from U.S. provisional application 63/400,735 filed on Aug. 24, 2022, the disclosures of which are incorporated by reference herein.

BACKGROUND OF THE INVENTION

1. Field of the Invention

The present disclosure relates to a reward calculation system, a reward calculation method, and an information storage medium.

2. Description of the Related Art

A user who concludes a transaction such as purchase of a commercial product or use of a service at a physical store or the like receives a receipt as a proof of payment. In Japanese Patent Application Laid-Open No. 2017-146634, there is disclosed a technology for giving reward points to a user who has photographed a receipt with a user terminal and transmitted image data of the receipt to a server.

SUMMARY OF THE INVENTION

When whether reward points (a reward) to be given match expectations is unclear, likelihood of receipt information being transmitted is small.

An object of the present disclosure is to motivate users to transmit receipt information.

According to the present disclosure, there is provided a reward calculation system including at least one processor configured to: acquire payment information about a payment of a transaction object traded on a user terminal used by a user; acquire a user attribute of the user; calculate an estimated reward potentially provided to the user terminal, based on at least the payment information and the user attribute; cause the user terminal to display the estimated reward; and acquire, after the estimated reward is displayed, receipt information included in a receipt image in which a receipt issued for a transaction of the transaction object is displayed.

BRIEF DESCRIPTION OF THE DRAWINGS

FIG. 3A A table for showing an example of user registration information stored in a user database.

FIG. 3B A table for showing an example of a payment history stored in the user database.

FIG. 4B A table for showing another example of the table about an evaluation coefficient which is stored in the established reward calculation database.

DETAILED DESCRIPTION OF THE INVENTION

[Outline of First Embodiment]

Figure 1:
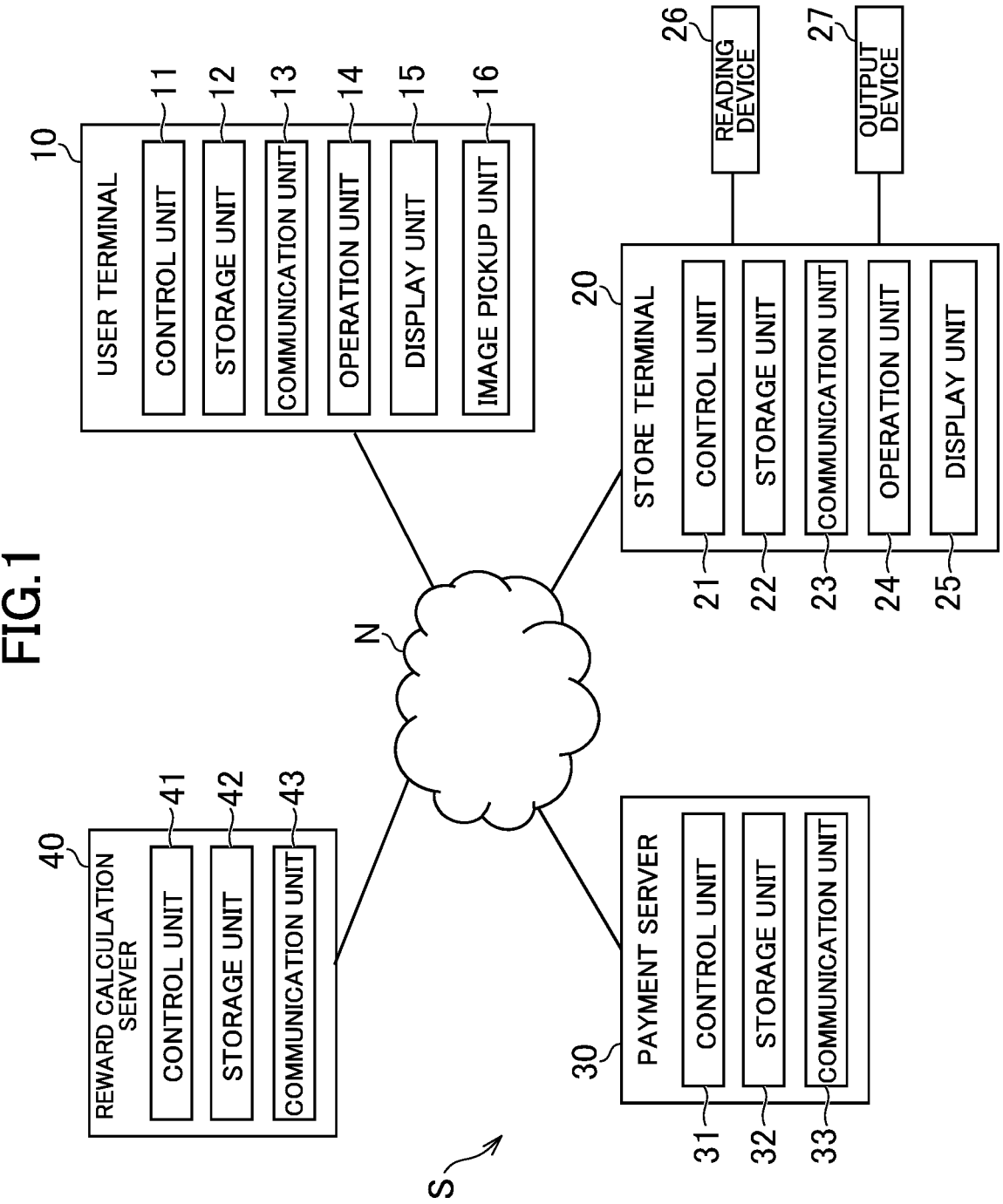
FIG. 1 A diagram for illustrating an example of an overall configuration of a reward calculation system according to a first embodiment.

In a reward calculation system S according to a first embodiment, a reward to be given to a user is calculated based on receipt information read from a receipt image. An example in which the user is given reward points usable in place of cash for the next or subsequent payment is described in the first embodiment. In the example described in the first embodiment, 1 point equals 1 Japanese yen. However, the reward is not limited to reward points, and can be any form of benefit to users. For example, the reward may be a coupon for a discount from a payment amount at the next or subsequent payment.

The receipt information read from a receipt image is useful from the viewpoint of keeping track of the user's transaction actions. With payment applications of the related art, a total amount of payment can be acquired from payment information, but specific information about a purchase such as what has been purchased cannot be acquired. In order to acquire specific information about a purchase, it is accordingly required to have the user photograph a receipt and transmit a photographed image of the receipt to a server managed by a business operator. However, the user is unlikely to go to the trouble of transmitting a receipt image without some motivation.

Thus, in the first embodiment, in order to motivate the user to transmit a receipt image, reward points are given as a reward to the user who has transmitted a receipt image. Points expected to be gained by transmitting a receipt image are also presented to the user prior to transmission of the receipt image. Further, greater points are given depending on usefulness of receipt information read from the receipt image, or on a past receipt transmission history of the user.

An example in which the user purchases a commercial product or uses a service (referred to as "purchase of a commercial product or the like" in some places in the following description) at a physical store and pays by electronic payment is described in the first embodiment. Electronic payment is a payment method that does not involve direct use of cash such as coins and paper currency, and is also called cashless payment.

Specifically, description is given on an example in which a reading device 26 set up at the physical store reads a user ID and payment information from a two-dimensional code displayed on a user terminal 10 by activating a payment application installed in the user terminal 10, and transmits those pieces of information to a payment server 30, to thereby execute payment processing. However, the present disclosure is not limited to this example, and a user scan method in which the user terminal 10 reads a store ID from a two-dimensional code presented by the store may be used.

The two-dimensional code displayed on the user terminal 10 is not limited to a Quick Response (QR) code illustrated in FIG. 6, which is described later, and may be a bar code expressed by lines in a stripe pattern. Payment may be executed also by selecting a store to which payment is to be made, through such operation as scanning a two-dimensional code put up at a physical store with a camera of the user terminal 10, and inputting a payment amount through the user's operation. The electronic payment is not limited to one that uses a two-dimensional code, and electronic payment payable from any medium is recommended. For example, a payment service may be used with an IC chip included in the user terminal 10, an IC card, or a magnetic card. To give another example, payment may be made by biometric authentication such as face authentication, without using the user terminal 10 or a card.

[Overall Configuration of Reward Calculation System S]

FIG. 1 is a diagram for illustrating an example of an overall configuration of the reward calculation system according to the first embodiment. The reward calculation system S includes the user terminal 10, a store terminal 20, the payment server 30, and a reward calculation server 40. A network N is the Internet, a LAN, or any other networks. It is sufficient for the reward calculation system S to include at least one computer, and the reward calculation system S is not limited to the example of FIG. 1. Although only one user terminal 10 and one store terminal 20 are illustrated in FIG. 1, the reward calculation system S is not limited thereto, and more than one user terminal 10 and more than one store terminal 20 may be connected to the payment server 30 and the reward calculation server 40 via the network N.

The user terminal 10 is a computer operated by the user who performs purchase of a commercial product or the like. For example, the user terminal 10 is a smart phone, a tablet terminal, or a wearable terminal. A control unit 11 includes at least one processor. A storage unit 12 includes a volatile memory such as a RAM, and a non-volatile memory such as a hard disk drive. A communication unit 13 includes at least one interface out of a communication interface for wired communication and a communication interface for wireless communication. An operation unit 14 is an input device such as a touch panel. A display unit 15 is a liquid crystal display, an organic EL display, or the like. An image pickup unit 16 is a camera for picking up an image of an image pick-up object.

An application for executing payment and giving reward points is recommended to be installed in the user terminal 10. An application for giving reward points may be installed in the user terminal 10 separately from a payment application.

The store terminal 20 is a computer placed at a physical store which provides a retail service or the like. The store terminal 20 is recommended to be a Point of Sales (POS) terminal. However, the store terminal 20 is not limited thereto, and may be a personal computer, a tablet terminal, or a smart phone. A control unit 21, a storage unit 22, a communication unit 23, an operation unit 24, and a display unit 25 have physical configurations that are the same as the physical configurations of the control unit 11, the storage unit 12, the communication unit 13, the operation unit 14, and the display unit 15, respectively.

The reading device 26 and an output device 27 are connected to the store terminal 20. The reading device 26 and the output device 27 may be included in the store terminal 20.

The reading device 26 is a device for reading an image or a storage medium, for example, a code reader. A clerk of the physical store reads, with the reading device 26, a two-dimensional code attached to a commercial product and a two-dimensional code displayed on the user terminal 10 by activating the payment application. In a case of unmanned self-checkout, it is recommended that the user operate the reading device 26 himself or herself to read a commercial product bar code and the two-dimensional code displayed on the user terminal 10 with the reading device 26. The reading device 26 may be, for example, a camera, a scanner, an NFC reader, or a magnetic card reader.

The output device 27 outputs, after payment, a receipt, which is a paper medium, based on the purchase of a commercial product or the like by the user. The receipt is issued as a proof of payment when the user performs a purchase of a commercial product or the like at a physical store. Text information about the purchase is printed on the receipt. The text information is, for example, a store name, an address of the store, a date and a time of the purchase, a name of a commercial product traded, an amount of money of each commercial product, and a total amount of money.

The output device 27 may output an electronic receipt as electronic data instead of a physical piece of paper. In this case, the output electronic receipt is recommended to be displayed on the user terminal 10.

The payment server 30 is a server computer for executing payment processing. The payment server 30 manages information on a balance of a payment account, and the like. A recommended method of payment on the payment server 30 is, for example, a pre-loading method in which the payment application installed in advance in the user terminal 10 is loaded with the balance, and a payment is made from the loaded balance. Alternatively, an immediate payment method in which a bank account or a debit card is registered as a payment source may be used. A future-dated payment method in which a credit card is registered as a payment source may also be used.

A control unit 31, a storage unit 32, and a communication unit 33 have physical configurations that are the same as the physical configurations of the control unit 11, the storage unit 12, and the communication unit 13, respectively.

The reward calculation server 40 is a server computer managed by a business operator that provides a reward point service. A control unit 41, a storage unit 42, and a communication unit 43 have physical configurations that are the same as the physical configurations of the control unit 11, the storage unit 12, and the communication unit 13, respectively.

Programs stored in the storage units 12, 22, 32, and 42 may be supplied via the network N. The storage units 12, 22, 32, and 42 may also be supplied with programs stored on computer-readable information storage media, via reading units (for example, optical disc drives or memory card slots) for reading information storage media, or input and output units (for example, USB ports) for input and output of data from and to external devices.

[Functions Implemented in Reward Calculation System S]

Figure 2:
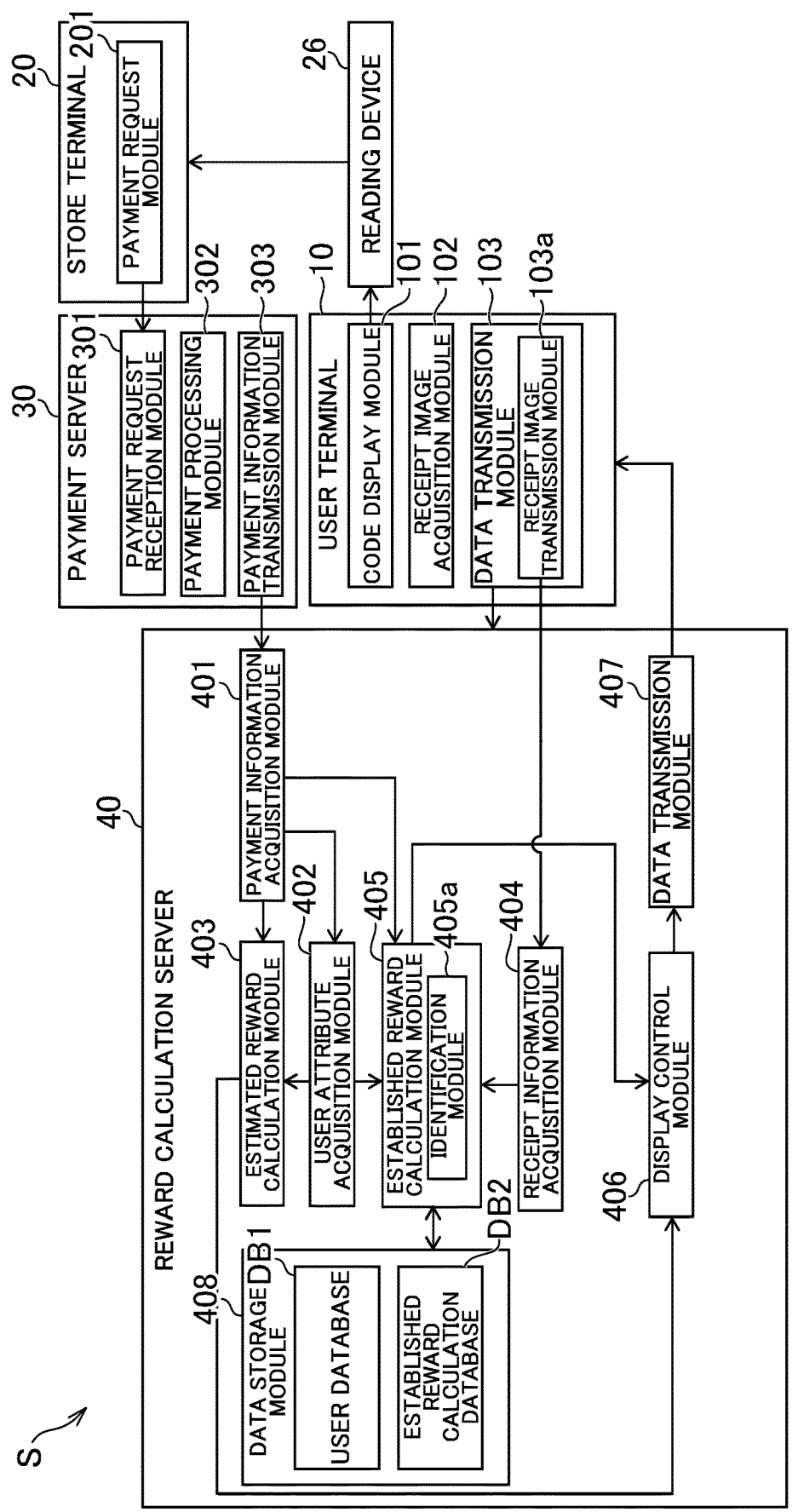
FIG. 2 A function block diagram for illustrating an example of functions implemented in the reward calculation system according to the first embodiment.

FIG. 2 is a function block diagram for illustrating an example of functions implemented in the reward calculation system according to the first embodiment. The functions illustrated in FIG. 2 are implemented by the computers by executing programs stored in the storage units. The programs may be stored on computer-readable information storage media.

[Functions Implemented in User Terminal 10]

In the user terminal 10, a code display module 101, a receipt image acquisition module 102, and a data transmission module 103 are implemented. The code display module 101 is implemented mainly by the control unit 11 and the display unit 15. The receipt image acquisition module 102 is implemented mainly by the control unit 11 and the image pickup unit 16. The data transmission module 103 is implemented mainly by the control unit 11 and the communication unit 13.

The code display module 101 displays a two-dimensional code for payment on the user terminal 10 in conjunction with activation of the payment application by the user's operation. The receipt image acquisition module 102 acquires a receipt image in which a receipt photographed with the camera included in the user terminal 10 is displayed.

The data transmission module 103 includes a receipt image transmission module 103*a*, and uses the receipt image transmission module 103*a* to transmit the receipt image to the reward calculation server 40. The data transmission module 103 may transmit a user ID, payment information, and the like to the reward calculation server 40 along with the transmission of the receipt image.

[Function Implemented in Store Terminal 20]

A payment request module 201 is implemented in the store terminal 20. The payment request module 201 is implemented mainly by the control unit 21 and the communication unit 23. The payment request module 201 receives a command from the reading device 26 which has read the two-dimensional code displayed on the user terminal 10, and issues a payment request to the payment server 30 under the command.

[Functions Implemented in Payment Server 30]

In the payment server 30, a payment request reception module 301, a payment processing module 302, and a payment information transmission module 303 are implemented. The payment request reception module 301 and the payment information transmission module 303 are implemented mainly by the control unit 31 and the communication unit 33. The payment processing module 302 is implemented mainly by the control unit 31.

The payment request reception module 301 receives the payment request from the payment request module 201 of the store terminal 20. The payment processing module 302 generates payment information by executing payment processing based on the payment request. The payment information transmission module 303 transmits the payment information generated by the payment processing module 302 to the reward calculation server 40. The payment information is information including at least a user ID, a store ID, and a payment amount.

[Functions Implemented in Reward Calculation Server 40]

In the reward calculation server 40, a payment information acquisition module 401, a user attribute acquisition module 402, an estimated reward calculation module 403, a receipt information acquisition module 404, an established reward calculation module 405, a display control module 406, a data transmission module 407, and a data storage module 408 are implemented.

The user attribute acquisition module 402, the estimated reward calculation module 403, the receipt information acquisition module 404, the established reward calculation module 405, and the display control module 406 are implemented mainly by the control unit 41. The payment information acquisition module 401 and the data transmission module 407 are implemented mainly by the control unit 41 and the communication unit 43. The data storage module 408 is implemented mainly by the storage unit 42.

The payment information acquisition module 401 receives and acquires the payment information transmitted from the payment server 30. The user attribute acquisition module 402 identifies attributes of the user based on the user ID included in the payment information and on a user database DB1 described later, and acquires the attributes. The user attributes are recommended to be, for example, an age, a gender, a place of residence, and an occupation.

The estimated reward calculation module 403 calculates estimated points based on at least the user attributes and the payment information. The estimated reward calculation module 403 may identify store attributes from the store ID included in the payment information. The estimated reward calculation module 403 may calculate estimated points based on the store attributes in addition to the user attributes.

The estimated points are a reward that may potentially be provided to the user terminal 10. As described later, points actually given to the user terminal 10 are established points, and the estimated points are a reward displayed on the user terminal 10 before the established points are given.

As described later with reference to FIG. 5, the estimated reward calculation module 403 may calculate estimated points with use of a learning model M, which is trained from learning data including the payment information and the user attributes as well as established points calculated in a past by the established reward calculation module 405.

The receipt information acquisition module 404 receives the receipt image transmitted from the user terminal 10, and acquires the receipt information included in the receipt image. The receipt information is recommended to be acquired by analyzing text information with use of Optical Character Recognition (OCR) or a similar technology. The receipt information is a store name, a name of a purchased commercial product, a price of the purchased commercial product, and the like. Although an example in which the receipt information acquisition module 404 receives the receipt image and acquires the receipt information as well is described in this embodiment, the reward calculation system S is not limited thereto. For example, the reward calculation system S may be configured so that the user terminal 10 is equipped with a function of acquiring the receipt information such as OCR, and transmits the receipt information acquired from the receipt image.

The established reward calculation module 405 calculates established points based on at least the user attributes and the receipt information. The established reward calculation module 405 is recommended to include an identification module 405*a* for identifying required information based on the receipt information. For example, the identification module 405*a* is recommended to identify store attributes from the store ID included in the receipt information, identify commercial product attributes from the commercial product names included in the receipt information, and identify a combination of commercial attributes included in one piece of receipt information. The established reward calculation module 405 is recommended to calculate established points based on, for example, the identified store attributes, commercial product attributes, and combination of commercial product attributes.

The established reward calculation module 405 may calculate established points with use of the payment information. That is, the established reward calculation module 405 may use the identification module 405a to identify store attributes from the store ID included in the payment information, and calculate established points based on the store attributes identified from the payment information. With the store attributes thus identified from the payment information, the store attributes can be identified with a precision higher than when the store attributes are read from the receipt image with the use of OCR or a similar technology.

The display control module 406 controls display on the user terminal 10. That is, the display control module 406 creates data of an image to be displayed on the user terminal 10. Specifically, the display control module 406 is recommended to create image data for displaying estimated points on the user terminal 10, and image data for displaying established points on the user terminal 10. The data transmission module 407 transmits the image data created by the display control module 406 to the user terminal 10.

The data storage module 408 stores the user database DB1 and an established reward calculation database DB2.

Figure 4A:
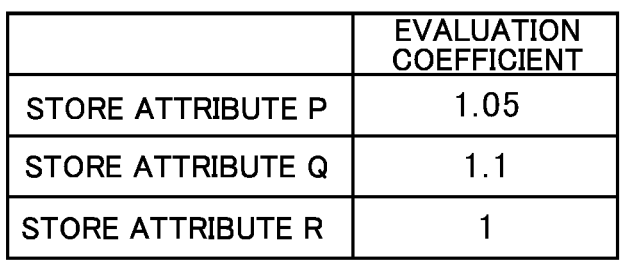
FIG. 4A A table for showing an example of a table about an evaluation coefficient which is stored in an established reward calculation database.

FIG. 3A is a table for showing an example of user registration information stored in the user database. FIG. 3B is a table for showing an example of a payment history stored in the user database. FIG. 4A and FIG. 4B are each a table for showing an example of a table about an evaluation coefficient which is stored in the established reward calculation database.

[User Database DB1]

The user database DB1 stores registration information of the user who uses the payment application. The user database DB1 also stores the user's payment history. In FIG. 3A, an example of a user ID, a name, an address, an age, and remaining points of each user stored in the user database DB1 is shown. In FIG. 3B, a payment history of one user is shown as an example. An example in which a payment date, a store ID, a store name, a payment amount, and a receipt transmission history are stored as a payment history is shown in FIG. 3B. The receipt transmission history is information about whether a receipt related to each payment has been transmitted.

[Established Reward Calculation Database DB2]

The established reward calculation database DB2 stores an evaluation coefficient associated with a store attribute or a commercial product attribute. In FIG. 4A, an example of an evaluation coefficient associated with a store attribute is shown. In FIG. 4B, an example of an evaluation coefficient associated with a combination of commercial product attributes is shown. The evaluation coefficient in the first embodiment is a coefficient taken into account in calculation of the established points.

It is recommended to set an appropriate evaluation coefficient based on usefulness of information. That is, the evaluation coefficient is recommended to have a higher value for information more useful to the business operator that provides the reward point service. For example, in a case in which the business operator that provides the reward point service desires to acquire information about a receipt issued when a commercial product that is a beverage in terms of commercial product attribute is purchased, a high evaluation coefficient is recommended to be set for beverages. The evaluation coefficient may be set so that data lacking in number is supplemented by identifying which data is lacking in number with use of k-means clustering or a similar method. That is, a high evaluation coefficient is recommended to be set for a user attribute, a store attribute, a commercial product attribute, or another type of data lacking in number.

As shown in FIG. 4A, when a store attribute identified from the receipt information is "store attribute P," for example, the evaluation coefficient is 1.05. The established reward calculation module 405 is recommended to calculate the established points by taking this evaluation coefficient into account. For example, in a case of purchases of the same commercial product, it is recommended to use the table shown in FIG. 4A to give, for transmission of a receipt issued in association with the store attribute P, points 1.05 times greater than points given when a receipt issued in association with a store attribute R is transmitted.

The established reward calculation module 405 is recommended to identify a combination of commercial product attributes of two or more commercial products included in the receipt information, and calculate the established points by taking into account an evaluation coefficient that is associated with the identified combination of commercial product attributes.

As shown in FIG. 4B, in a case in which commercial product attributes identified from the receipt information are "commercial product attribute X" and "commercial product attribute Y," the evaluation coefficient is 1.3. For example, in a case of purchases of two commercial products at the same store, it is recommended to use the table shown in FIG. 4B to give, for transmission of a receipt issued to a purchase of two commercial products that have the "commercial product attribute X" and the "commercial product attribute Y," points 1.3 times greater than points given when a receipt issued to a purchase of two commercial products each of which has the "commercial product attribute X" is transmitted.

Specifically, when the commercial product attribute X is "beverage" and the commercial product attribute Y is "boxed lunch," for example, it is recommended to give points calculated by taking an evaluation coefficient of 1.3 into account to the user terminal 10 that has transmitted a receipt issued as a result of purchasing a can of juice and a curry boxed lunch together. For example, in a case in which points calculated before the evaluation coefficient is taken into account are 50, 65 points may be given as established points to the user terminal 10.

Although an evaluation coefficient associated with a combination of two commercial product attributes is shown in FIG. 4B, the number of commercial product attributes in a combination may be three or more. The combination is not limited to a combination of commercial product attributes, and may be a combination of a commercial product attribute and a store attribute, a combination of a commercial product attribute and a user attribute, or the like. For example, when it is desired to acquire information of a receipt issued for a purchase of a medicinal product by a male, it is recommended to set a higher value to an evaluation coefficient associated with a combination of a user attribute that is "male" and a commercial product attribute that is "medicinal product."

[Example of Point Calculation]

An example of calculation of the estimated points and the established points is now described with reference to FIG. 5. FIG. 5 is a diagram for schematically illustrating an example of calculation of the estimated points and the established points in the first embodiment.

Figure 5:
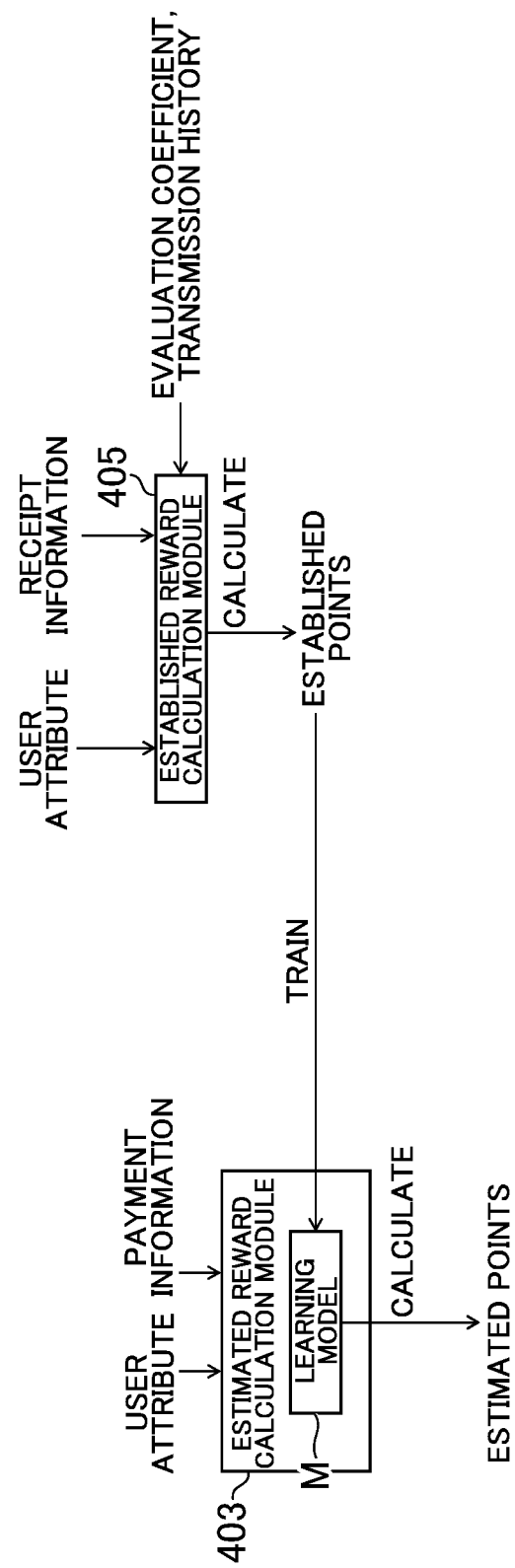
FIG. 5 A diagram for schematically illustrating an example of calculation of estimated points and established points.

As shown in FIG. 5, the estimated reward calculation module 403 is recommended to calculate the estimated points with the use of the learning model M, which is trained from learning data including the payment information and the user attributes as well as established points calculated by the established reward calculation module 405.

The established reward calculation module 405 is recommended to calculate the established points based on at least the user attributes and the receipt information. The established reward calculation module 405 is also recommended to calculate the established points by taking the evaluation coefficient into account with use of various types of data stored in the data storage module 408 described above.

The established reward calculation module 405 may calculate the established points by taking into account the receipt transmission history included in the payment history shown in FIG. 3B. For example, greater points are recommended to be given as the established points to the user terminal 10 that has transmitted receipt images many times. Users can be motivated to transmit receipt images by thus giving greater points for a higher count of transmission of receipt images.

The estimated reward calculation module 403 may calculate the estimated points with use of the receipt information acquired in a past by the user terminal 10. For example, in a case in which the same amount of money is paid at a store having the same attribute as an attribute found in the receipt information acquired in a past, the estimated reward calculation module 403 is recommended to calculate, as the estimated points, the same points as the established points that have been calculated based on the receipt information acquired in a past.

[Screen Transitions]

Transitions of screens displayed on the user terminal 10 in the first embodiment are described below with reference to FIG. 6 and FIG. 7. FIG. 6 is a diagram for illustrating an example of display screens that are displayed on the user terminal from a time of checkout to display of the estimated points in the first embodiment. FIG. 7 is a diagram for illustrating an example of display screens that are displayed on the user terminal after the display screens illustrated in FIG. 6, from a time of photographing a receipt to display of the established points.

In the following description, it is assumed that installation of the payment application in the user terminal 10 and registration of login account information including account information are executed in advance in response to the user's operation.

Figure 6:
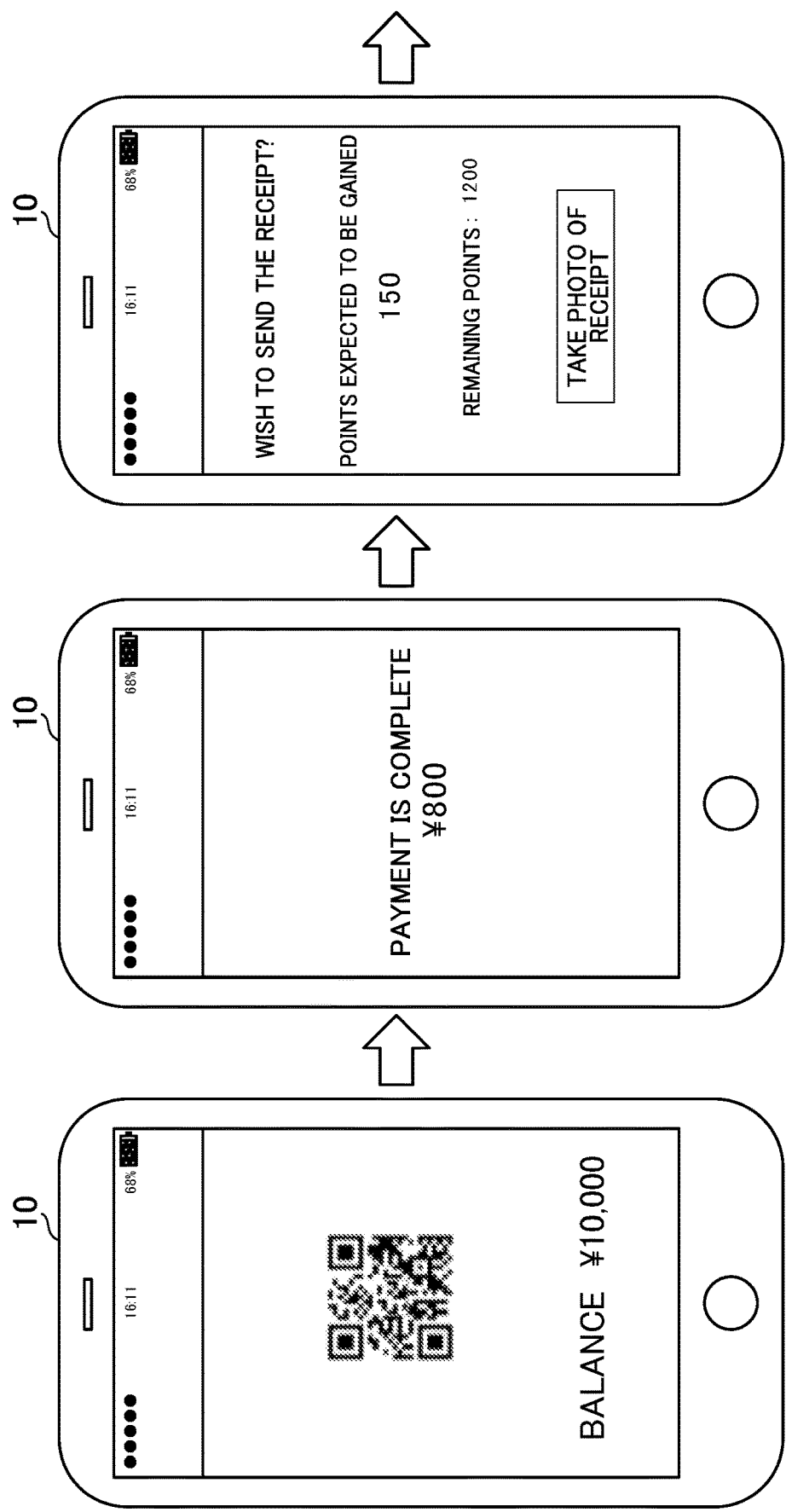
FIG. 6 A diagram for illustrating an example of display screens that are displayed on a user terminal from a time of checkout to display of estimated points in the first embodiment.
Figure 7:
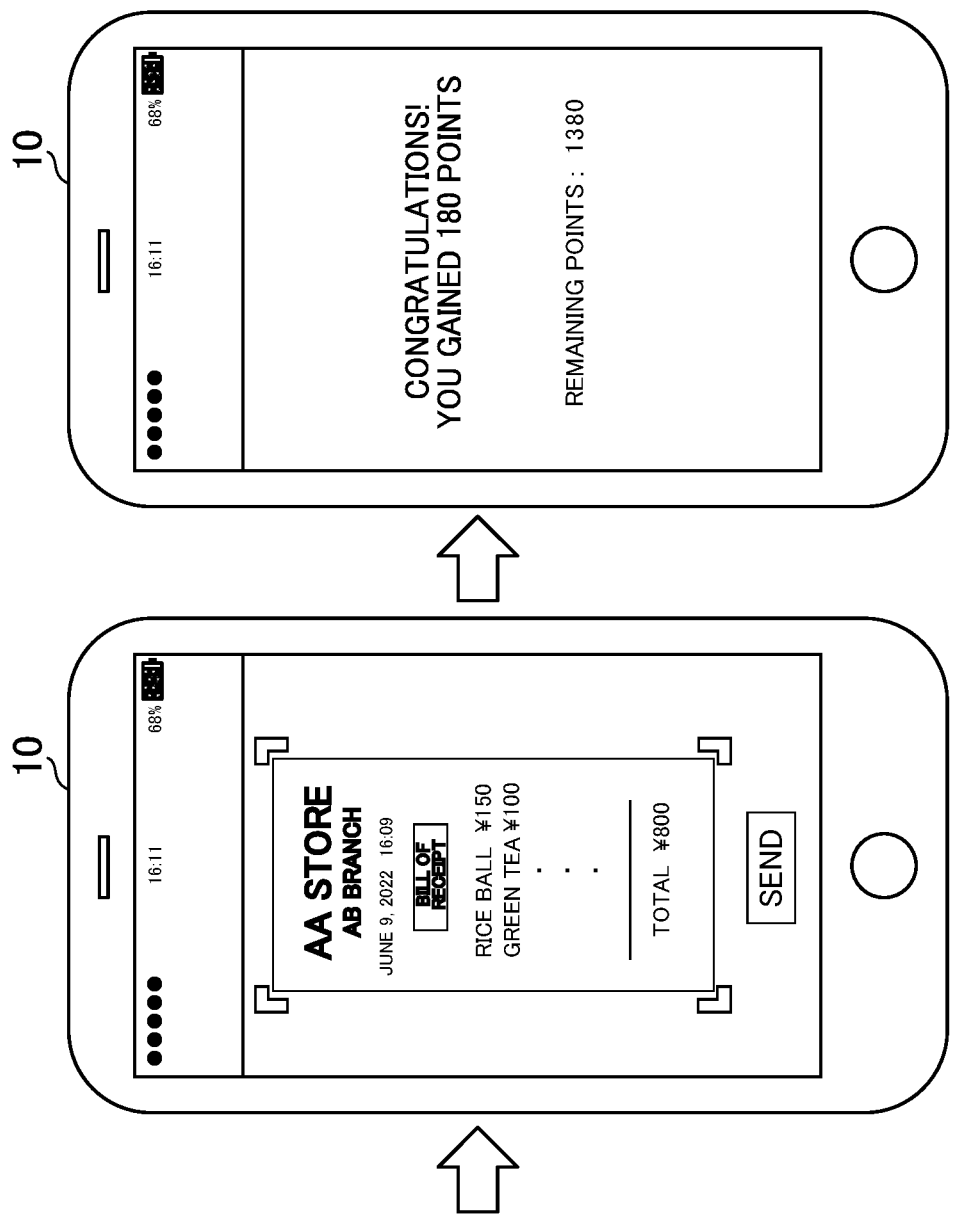
FIG. 7 A diagram for illustrating an example of display screens that are displayed on the user terminal after the display screens illustrated in FIG. 6, from a time of photographing a receipt to display of established points.

As illustrated in FIG. 6, a two-dimensional code is displayed first on the user terminal 10 in conjunction with activation of the payment application by the user's operation. At this point, the balance of the loaded amount is recommended to be displayed as well so that the loaded amount is enough for the amount to be paid.

A clerk of the physical store, or the user himself or herself, operates the reading device 26, which is a code reader, to read the two-dimensional code displayed on the user terminal 10. This causes transmission of a payment request to the payment server 30, on which the payment processing is executed. In a case in which the payment processing is completed, a message to the effect that payment (the payment processing) is complete is displayed on the user terminal 10 as illustrated in FIG. 6.

The estimated points which are an estimated reward are further displayed on the user terminal 10. In FIG. 6, an example of displaying a message informing that 150 points are to be gained by transmitting a receipt image is illustrated. At the time of displaying the estimated points, a button for activating a camera mounted on the user terminal 10 is recommended to be displayed along with the estimated points. The camera mounted on the user terminal 10 is recommended to be activated by the user's tap on a "take photo of receipt" button illustrated in FIG. 6.

It is recommended that the receipt be then photographed by the user's operation as illustrated in FIG. 7. FIG. 7 is illustration of photographing of a receipt issued when 800 yen is paid for a purchase of a rice ball, green tea, and the like at the AA store with the camera of the user terminal 10.

The user terminal 10 is recommended to display a button for transmission as illustrated in FIG. 7 after the receipt is photographed. With the user's tap on a "send" button illustrated in FIG. 7, a receipt image in which the receipt is displayed is transmitted to the reward calculation server 40. An established reward is calculated on the reward calculation server 40, based on the receipt information included in the receipt image. A result of the calculation is transmitted to the user terminal 10 and displayed on the user terminal 10.

In FIG. 7, a screen displayed on the user terminal 10 in a case in which 180 points are given as the established points, which are an established reward, is illustrated. It is recommended to display, at this point, remaining points which include the points given just now as well.

The established points are not limited to immediately given points, and may be, for example, given after a few days.

[Processing Executed in Reward Calculation System S]

Figure 8:
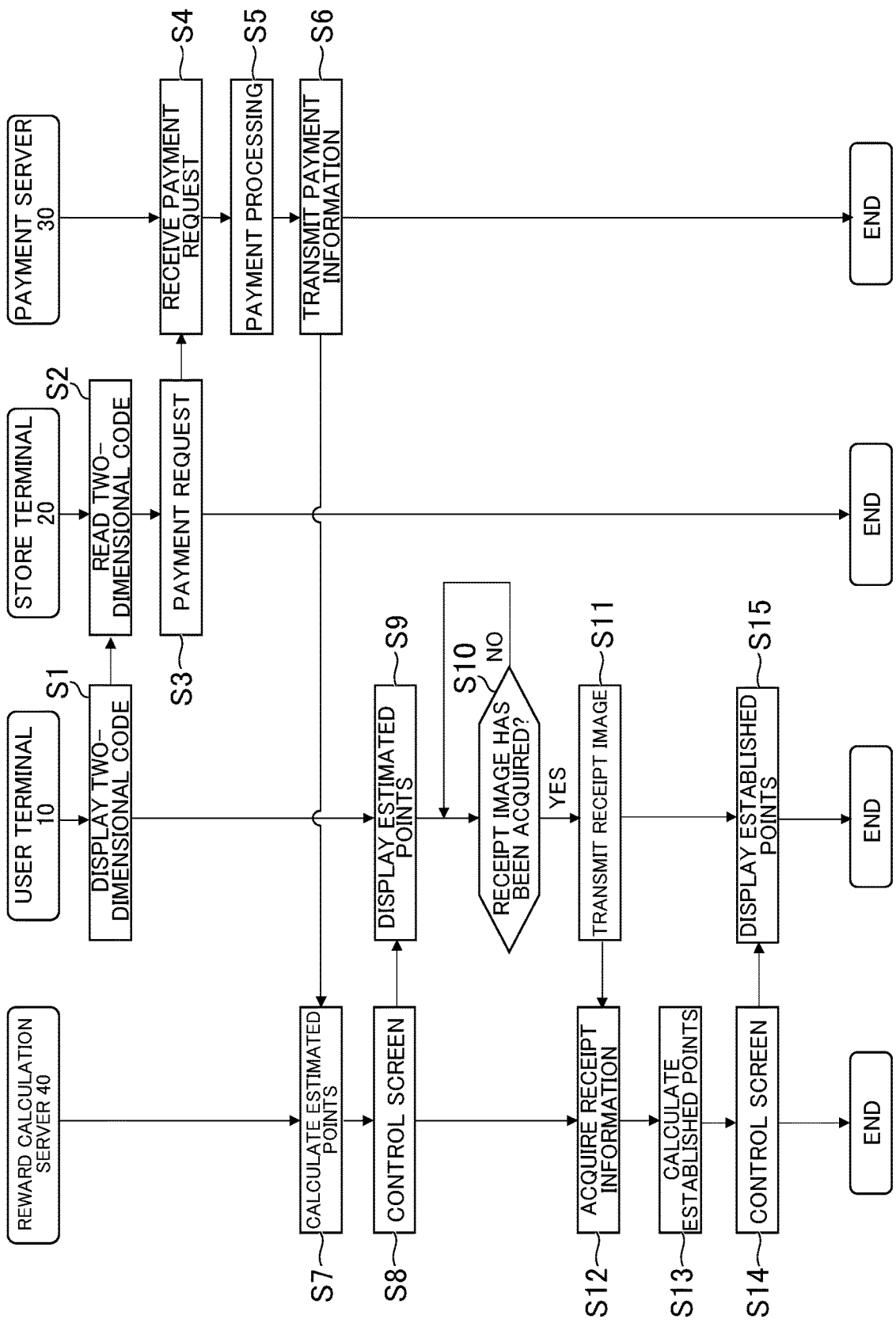
FIG. 8 A diagram for illustrating an example of a flow of processing executed in the reward calculation system according to the first embodiment.

FIG. 8 is a diagram for illustrating an example of a flow of processing executed in the reward calculation system according to the first embodiment. This processing is executed by the control units 11, 21, 31, and 41 operating in accordance with programs stored in the storage units 12, 22, 32, and 42, respectively.

First, the user terminal 10 uses the code display module 101 to display a two-dimensional code in conjunction with activation of the payment application by the user's operation (Step S1). Next, the store terminal 20 reads the two-dimensional code displayed on the user terminal 10, with the reading device 26 connected to the store terminal 20 (Step S2). After reading the two-dimensional code, the store terminal 20 uses the payment request module 201 to transmit a payment request to the payment server 30 (Step S3).

The payment server 30 receives the payment request with the payment request reception module 301 (Step S4). The payment server 30 executes payment processing with the payment processing module 302, based on the received payment request (Step S5). The payment server 30 uses the payment information transmission module 303 to transmit payment information to the reward calculation server 40 (Step S6).

The reward calculation server 40 acquires the payment information with the payment information acquisition module 401, and calculates the estimated points based on the acquired payment information and on user attributes acquired by the user attribute acquisition module 402 (Step S7). After calculating the estimated points, the reward calculation server 40 executes screen control of the user terminal 10 with the display control module 406 and the data transmission module 407 (Step S8). The user terminal 10 under screen control by the reward calculation server 40 displays the estimated points (Step S9).

When the user photographs the receipt with the camera, the user terminal 10 uses the receipt image acquisition module 102 to acquire a receipt image (YES in Step S10), and then transmits the receipt image to the reward calculation server 40 in response to the user's operation (Step S11).

The reward calculation server 40 acquires the receipt information with the receipt information acquisition module 404, based on the receipt image transmitted from the user terminal 10 (Step S12). The reward calculation server 40 uses the established reward calculation module 405 to calculate the established points based on at least the receipt information and the user attributes (Step S13). After calculating the established points, the reward calculation server 40 executes screen control of the user terminal 10 with the display control module 406 and the data transmission module 407 (Step S14). The user terminal 10 under screen control by the reward calculation server 40 displays the established points (Step S15).

[Others]

In the first embodiment, the estimated points may be minimum points actually given to the user terminal 10. That is, when the established points calculated by the established reward calculation module 405 are less than the estimated points calculated by the estimated reward calculation module 403, established points having the same value as that of the estimated points are recommended to be given to the user terminal 10. This ensures that at least the estimated points displayed before transmission of the receipt image are gained, and accordingly prevents loss of motivation for the user to transmit a receipt image.

The reward calculation system S may be configured so that, when the receipt image is transmitted from the user terminal 10, an answer to a questionnaire is transmitted as well. The questionnaire is recommended to be about, for example, the user's hobby. The established reward calculation module 405 may give greater points as the established points to the user terminal 10 from which the questionnaire is transmitted.

The business operator that provides the reward point service is recommended to notify the user terminal 10 when wishing to acquire a receipt image in which a specific attribute is displayed. For example, when wishing to acquire a receipt image in which a receipt issued to a purchase of clothes by a male is displayed, the business operator is recommended to notify that great points are to be gained by transmission of an image of a receipt issued at an apparel store, to the user terminal 10 that has "male" as a user attribute.

The functions described as functions implemented in the reward calculation server 40 may be implemented in the user terminal 10, the store terminal 20, the payment server 30, or another computer. Any function described as a function implemented in one computer may be distributed among a plurality of computers.

[Summary of First Embodiment]

In the first embodiment described above, estimated points potentially provided to a user can be presented in advance. The user can thus be motivated to transmit receipt information. In addition, giving greater points to specific users is accomplished through calculation of established points that takes into account an evaluation coefficient based on a user attribute, a store attribute, a commercial product attribute, and the like. As a result, the business operator that provides the reward point service can acquire desired receipt information.

Second Embodiment

Next, a second embodiment is described with reference to FIG. 9 to FIG. 12. In the second embodiment, an example in which a quiz question using a receipt image is created and points depending on an answer thereto are given to a user terminal is described. It is recommended also in the second embodiment to calculate estimated points, which are an estimated quiz questioner reward, based on user attributes and payment information as in the first embodiment. The estimated points are recommended to be displayed on the user terminal (quiz questioner terminal 10A) prior to transmission of the receipt image.

Figure 9:
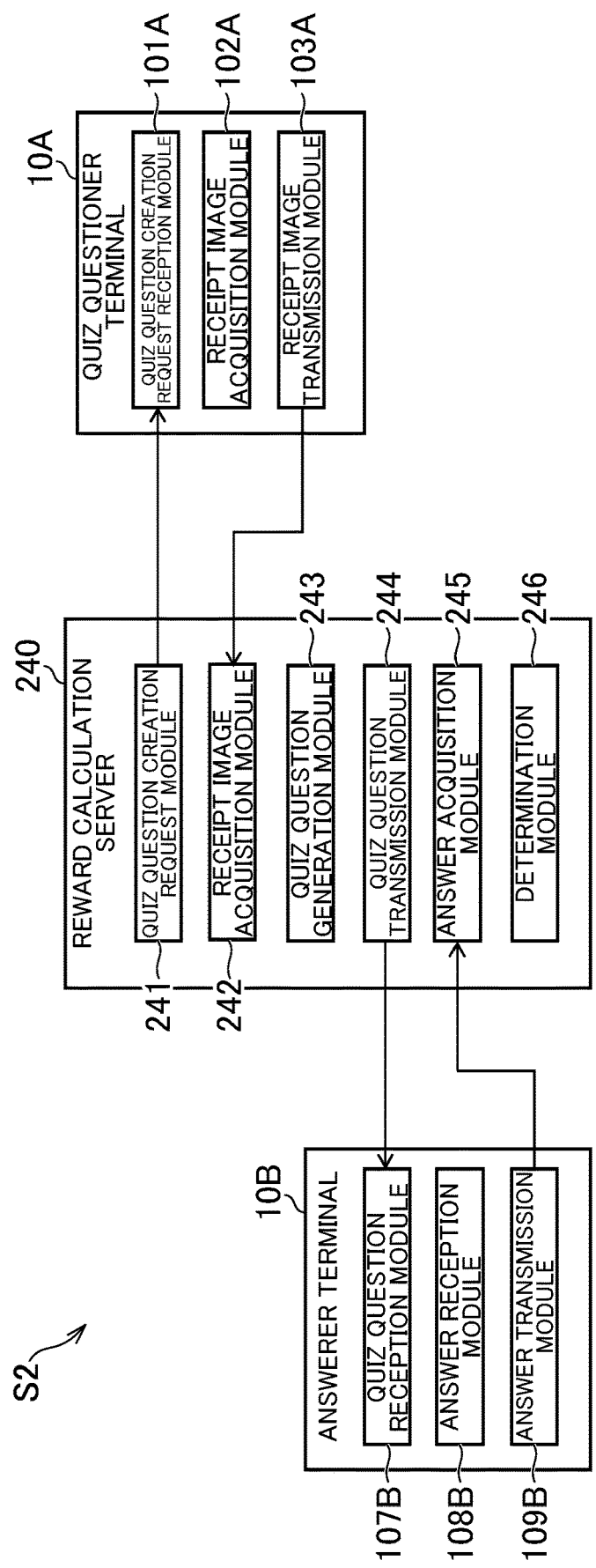
FIG. 9 A function block diagram for illustrating an example of functions implemented in a reward calculation system according to a second embodiment.

FIG. 9 is a function block diagram for illustrating an example of functions implemented in a reward calculation system according to the second embodiment. A reward calculation server 240 included in a reward calculation system S2 according to the second embodiment is recommended to include the same physical configuration and function configuration as the physical configuration and function configuration of the reward calculation server 40 included in the reward calculation system S according to the first embodiment. The quiz questioner terminal 10A and an answerer terminal 10B which are illustrated in FIG. 9 are recommended to include the same physical configuration and function configuration as the physical configuration and function configuration of the user terminal 10 described in the first embodiment. In FIG. 9, the function configuration described in the first embodiment is illustrated with a part thereof omitted.

[Functions Implemented in Quiz Questioner Terminal 10A]

In the quiz questioner terminal 10A, which is a first terminal, a quiz question creation request reception module 101A, a receipt image acquisition module 102A, and a receipt image transmission module 103A are implemented.

The quiz question creation request reception module 101A receives a quiz question creation request transmitted from the reward calculation server 240. The receipt image acquisition module 102A acquires a receipt image in which a receipt is displayed in response to a user's operation. The receipt image transmission module 103A transmits the receipt image to the reward calculation server 240.

[Functions Implemented in Answerer Terminal 10B]

In the answerer terminal 10B, which is a second terminal, a quiz question reception module 107B, an answer reception module 108B, and an answer transmission module 109B are implemented.

The quiz question reception module 107B receives a quiz question from the reward calculation server 240. The answer reception module 108B receives input of an answer to the quiz question in response to operation performed by a user of the answerer terminal 10B. The answer transmission module 109B transmits the answer to the reward calculation server 240.

[Functions Implemented in Reward Calculation Server 240]

In the reward calculation server 240, a quiz question creation request module 241, a receipt image acquisition module 242, a quiz question generation module 243, a quiz question transmission module 244, an answer acquisition module 245, and a determination module 246 are implemented.

The quiz question creation request module 241 issues a quiz question creation request to the quiz questioner terminal 10A, after the payment information acquisition module 401 illustrated in FIG. 2 acquires payment information transmitted from the payment server 30. The receipt image acquisition module 242 acquires the receipt image transmitted from the quiz questioner terminal 10A. The quiz question generation module 243 generates a quiz question by processing at least a part of the receipt image. The quiz question transmission module 244 transmits the quiz question to the quiz questioner terminal 10A and the answerer terminal 10B. The answer acquisition module 245 acquires an answer to the quiz question from the answerer terminal 10B.

The determination module 246 determines whether the answer is correct or incorrect. The determination module 246 is recommended to determine whether to give points (a quiz questioner reward) to the quiz questioner terminal 10A, and whether to give points (an answerer reward) to the answerer terminal 10B, depending on whether the answer is correct or incorrect. For example, the determination module 246 is recommended to determine that points are given to the quiz questioner terminal 10A when the answer transmitted from the answerer terminal 10B is incorrect. On the other hand, the determination module 246 is recommended to determine that points are to be given to the answerer terminal 10B when the answer transmitted from the answerer terminal 10B is correct. Alternatively, points may be given to the quiz questioner terminal 10A that has transmitted the receipt image irrespective of whether the answer is correct or incorrect.

[Screen Transitions]

Figure 10:
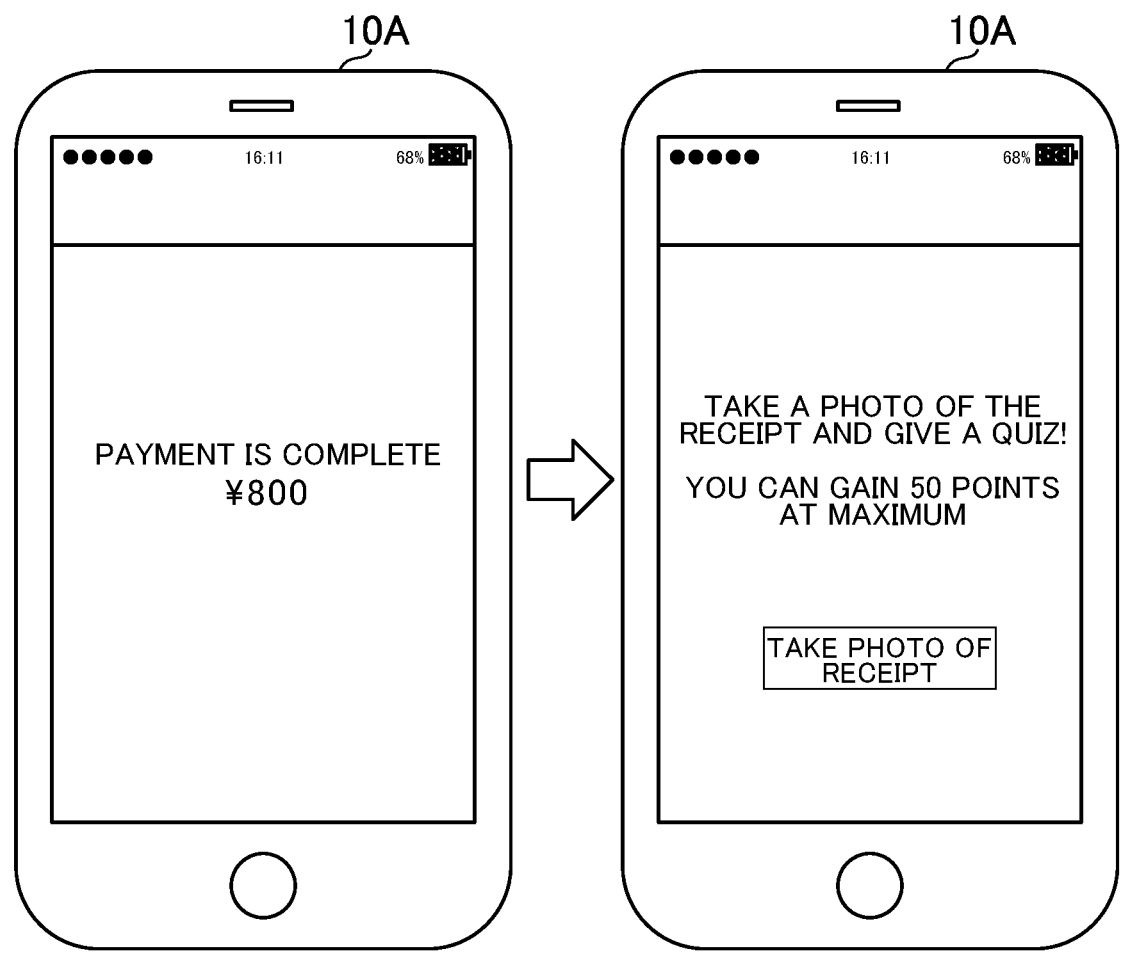
FIG. 10 A diagram for illustrating an example of screens that are displayed on a quiz questioner terminal prior to photographing of the receipt, from a time of checkout.
Figure 11:
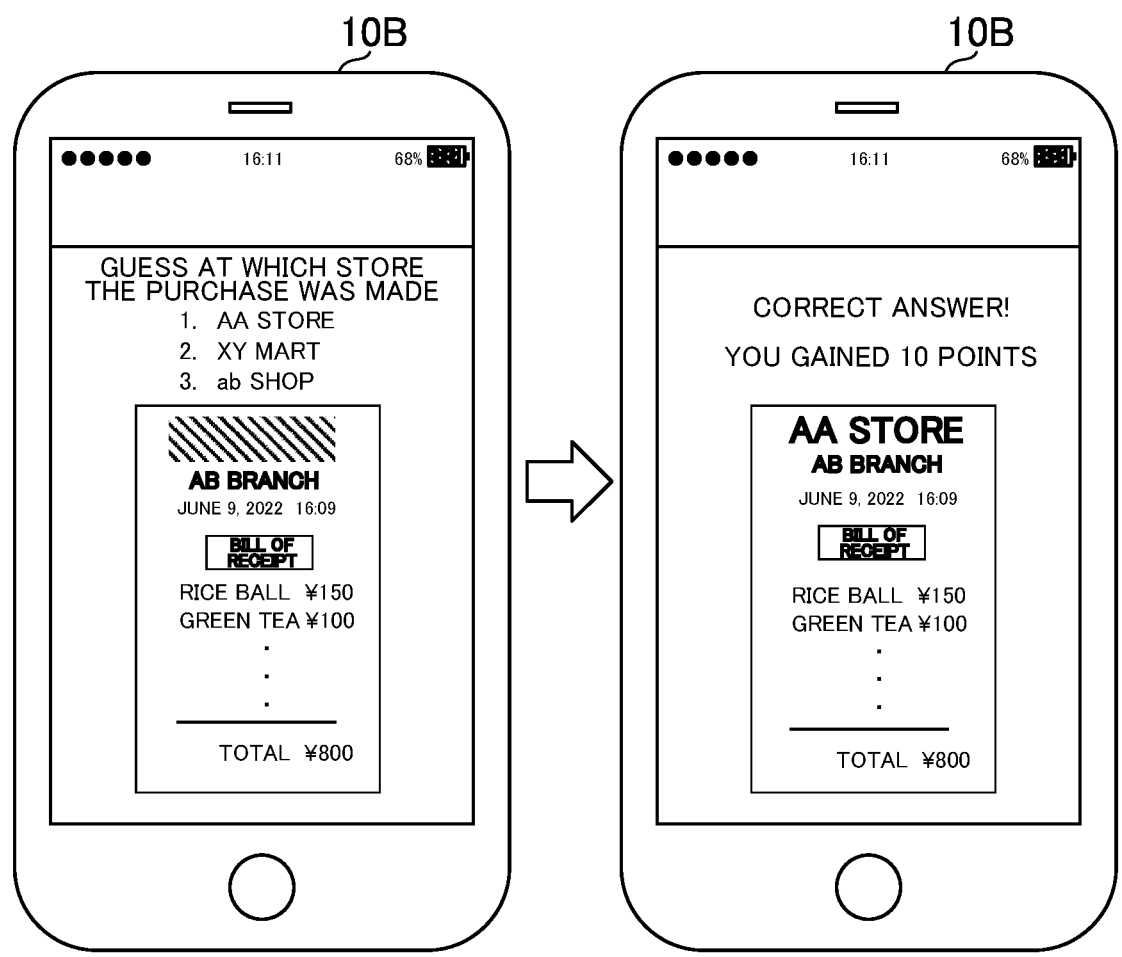
FIG. 11 A diagram for illustrating an example of a transition of screens on an answerer terminal from display of a quiz question to determination of a correct answer or an incorrect answer in a case in which an answerer gives the correct answer.
Figure 12:
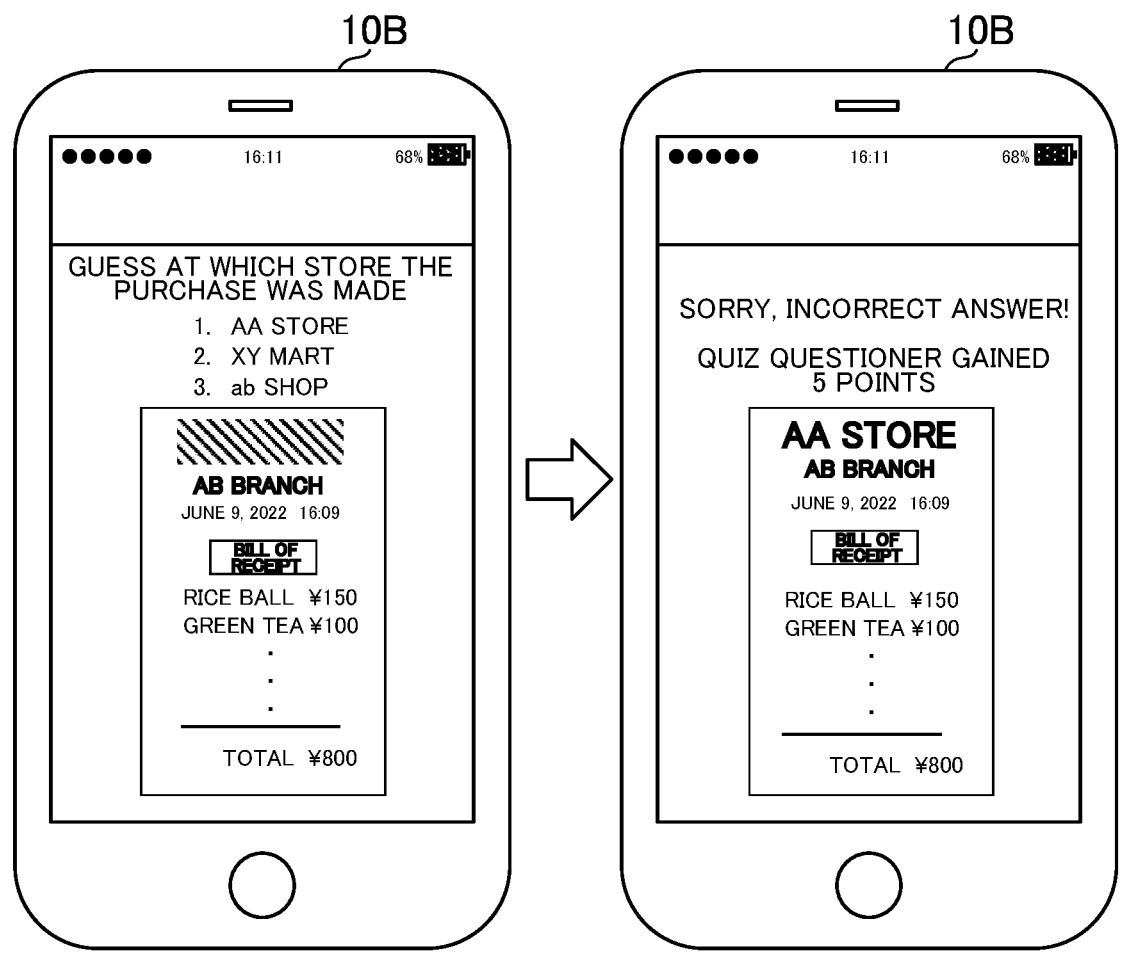
FIG. 12 A diagram for illustrating an example of a transition of screens on the answerer terminal from display of a quiz question to determination of a correct answer or an incorrect answer in a case in which the answerer gives the incorrect answer.

A transition of screens displayed on the quiz questioner terminal 10A is described with reference to FIG. 10. Transitions of screens displayed on the answerer terminal 10B are described with reference to FIG. 11 and FIG. 12. FIG. 10 is a diagram for illustrating an example of screens that are displayed on the quiz questioner terminal prior to photographing of a receipt, from a time of checkout. FIG. 11 is a diagram for illustrating an example of a transition of screens on the answerer terminal from display of a quiz question to determination of a correct answer or an incorrect answer in a case in which the answerer gives the correct answer. FIG. 12 is a diagram for illustrating an example of a transition of screens on the answerer terminal from display of a quiz question to determination of a correct answer or an incorrect answer in a case in which the answerer gives the incorrect answer.

After payment is completed, a message to the effect that payment (payment processing) is complete is displayed on the quiz questioner terminal 10A as illustrated in FIG. 10. A prompt to issue a quiz question is further displayed on the quiz questioner terminal 10A. A button for activating the camera mounted on the user terminal 10 is recommended to be displayed along with the display of the prompt to issue a quiz question. The camera mounted on the quiz questioner terminal 10A is recommended to be activated with the user's tap on "take photo of receipt" illustrated in FIG. 10. When the prompt to issue a quiz question is displayed, points expected to be given may be displayed as illustrated in FIG. 10. This can motivate the user of the quiz questioner terminal 10A to transmit a receipt image.

A receipt image in which the receipt is displayed is recommended to be subsequently transmitted to the reward calculation server 240 in response to operation performed by the user of the quiz questioner terminal 10A. On the reward calculation server 240 receiving the receipt image, a quiz question is created based on the receipt image, and is transmitted to the answerer terminal 10B. The reward calculation system S2 may be configured so that the user of the quiz questioner terminal 10A can specify who is to be an answerer, or the reward calculation server 240 may determine any person to be an answerer. For example, the reward calculation server 240 is recommended to detect a friend of the user who uses the quiz questioner terminal 10A based on a user database in which user registration information is stored, and select a terminal used by the detected user as the answerer terminal 10B.

The answerer terminal 10B receives the quiz question from the reward calculation server 240, and then executes display illustrated in FIG. 11. In FIG. 11, a quiz question generated by performing processing in which a store name in the receipt image is painted out is illustrated. An example in which three answer options are listed is illustrated in FIG. 11. The user of the answerer terminal 10B is expected to figure out the correct answer by checking information displayed in the receipt image, such as names and prices of commercial products and the address of the store.

In FIG. 11, an example of a case in which the user of the answerer terminal 10B gives the correct answer to the quiz question is illustrated. Specifically, in the illustrated example, the determination module 246 of the reward calculation server 240 determines whether an answer transmitted from the answer transmission module 109B of the answerer terminal 10B is correct or incorrect, and the display control module 406 displays, on the answerer terminal 10B, a message to the effect that the answer is correct and points given to the answerer terminal 10B.

In FIG. 12, on the other hand, an example of a case in which the user of the answerer terminal 10B gives an incorrect answer to the quiz question is illustrated. Specifically, in the illustrated example, the determination module 246 of the reward calculation server 240 determines whether an answer transmitted from the answer transmission module 109B of the answerer terminal 10B is correct or incorrect, and the display control module 406 displays, on the answerer terminal 10B, a message to the effect that the answer is incorrect and points given to the quiz questioner terminal 10A.

Although an example in which a quiz question is generated by the quiz question generation module 243 on the reward calculation server 240 is described in the second embodiment, the reward calculation system S2 is not limited thereto. For example, a quiz question may be generated on the quiz questioner terminal 10A. In this case, for example, a format of a quiz question may be generated on the reward calculation server 240 and transmitted to the quiz questioner terminal 10A. The user of the quiz questioner terminal 10A may generate a quiz question by editing the received format of a quiz question. The reward calculation system S2 may also be configured so that the user of the quiz questioner terminal 10A can input any answer options.

It is recommended also in the second embodiment to give greater points depending on a user's past receipt transmission history as in the first embodiment. The reward calculation system S2 may also be configured so that greater points are given depending on the number of times a user has answered to past quiz questions, or the number of times a user has given the correct answer.

A notification may be made to a user terminal used by a user who has transmitted a receipt or has answered to a quiz question in a small number of times in a past. This can motivate the user to transmit a receipt.

[Summary of Second Embodiment]

In the second embodiment described above, a user can be motivated to transmit a receipt image by an element of entertainment in that a quiz question is issued based on a receipt image. In addition, exchanges regarding the quiz question can be enlivened more by giving a chance to gain points also to a user who is an answerer. As a result, the business operator that provides the reward point service can acquire more pieces of receipt information.

SUPPLEMENTARY NOTES

For example, the reward calculation system may have the following configurations.

(1)

A reward calculation system, including:
a payment information acquisition module configured to acquire payment information about a payment of a transaction object traded on a user terminal used by a user;
a user attribute acquisition module configured to acquire a user attribute of the user;
an estimated reward calculation module configured to calculate an estimated reward potentially provided to the user terminal, based on at least the payment information and the user attribute;
a display control module configured to cause the user terminal to display the estimated reward; and
a receipt information acquisition module configured to acquire, after the estimated reward is displayed, receipt information included in a receipt image in which a receipt issued for a transaction of the transaction object is displayed.

(2)

The reward calculation system according to Item (1), including an established reward calculation module configured to calculate an established reward to be given to the user terminal, based on at least the receipt information and the user attribute.

(3)

The reward calculation system according to Item (2), wherein the estimated reward calculation module is configured to calculate the estimated reward with use of a learning model that is trained from learning data including the payment information and the user attribute as well as an established reward calculated in a past by the established reward calculation module.

(4)

The reward calculation system according to Item (2) or (3), including a storage module configured to store an evaluation coefficient in association with an attribute of the transaction object,
wherein the established reward calculation module includes an identification module configured to identify the attribute of the transaction object from the receipt information, and is configured to calculate the established reward based on at least the user attribute and the evaluation coefficient that is associated with the attribute of the transaction object identified by the identification module.

(5)

The reward calculation system according to any one of Items (2) to (4), including a storage module configured to store an evaluation coefficient in association with a combination of two or more transaction objects,
wherein the established reward calculation module includes an identification module configured to identify a combination of transaction objects from the receipt information, and is configured to calculate the established reward based on at least the user attribute and the evaluation coefficient that is associated with the combination of transaction objects identified by the identification module.

(6)

The reward calculation system according to any one of Items (2) to (5), including a storage module configured to store an evaluation coefficient in association with a store attribute,
wherein the established reward calculation module includes an identification module configured to identify the store attribute from the receipt information, and is configured to calculate the established reward based on at least the user attribute and the evaluation coefficient that is associated with the store attribute identified by the identification module.

(7)

The reward calculation system according to any one of Items (2) to (6), including a storage module configured to store a transmission history of the receipt image in the user terminal,
wherein the established reward calculation module is configured to calculate the established reward based on at least the receipt information, the user attribute, and the transmission history.

(8)

The reward calculation system according to any one of Items (2) to (7), including the user terminal and a server,
wherein the user terminal includes:
a receipt image acquisition module configured to acquire a receipt image in which the receipt is displayed; and
a receipt image transmission module configured to transmit the receipt image to the server.

(9)

The reward calculation system according to Item (1), including:
a receipt image acquisition module configured to acquire a receipt image that is transmitted from a first user terminal used by a first user, and that displays a receipt issued for a transaction of the transaction object;
a quiz question generation module configured to generate a quiz question by processing at least a part of the receipt image;
a quiz question transmission module configured to transmit the quiz question to a second user terminal used by a second user; and
an answer acquisition module configured to acquire, from the second user terminal, an answer to the quiz question,
wherein the estimated reward calculation module is configured to calculate an estimated quiz questioner reward potentially provided to the first user terminal, based on at least the payment information and a user attribute of the first user.

(10)

The reward calculation system according to Item (9), including a determination module configured to determine whether the answer is correct or incorrect, and to determine whether to give an answerer reward to the second user terminal.

What is claimed is:

1. A reward calculation system, comprising:
a reward calculation server, the reward calculation server comprising a first processor configured to;
acquire payment information about a completed payment of a transaction object traded on a user terminal used by a user;
acquire a user attribute of the user;
calculate an estimated reward potentially provided to the user, based on at least the payment information and the user attribute, wherein the estimated reward is a reward to be provided to the user if the user transmits a receipt image in which a receipt issued for the completed payment of the transaction object is displayed to the system;

cause the user terminal to display the calculated estimated reward after the payment information is acquired;

receive, after the estimated reward is displayed, the receipt image from the user terminal;

acquire receipt information included in the receipt image by analyzing text information included in the receipt image; and calculate an established reward to be provided to the user, based on at least the receipt information and the user attribute; and the user terminal, the user terminal comprising a second processor, via execution of a payment application, configured to:

display a graphical user interface comprising the calculated estimated reward and a first user operation button configured to activate a camera mounted on the user terminal to obtain the receipt image;

acquire the receipt image in response to a user operation with the first user operation button;

display a graphical user interface comprising a second user operation button configured to cause the user terminal to transmit the receipt image to the reward calculation server; and transmit the receipt image to the reward calculation server in response to a user operation with the second user operation button.

2. The reward calculation system according to claim 1, wherein the first processor is configured to calculate the estimated reward with use of a learning model that is trained from learning data including the payment information and the user attribute as well as an established reward calculated in a past.

3. The reward calculation system according to claim 1, wherein the first processor is configured to store an evaluation coefficient in association with an attribute of the transaction object, wherein the first processor is configured to identify the attribute of the transaction object from the receipt information, and is configured to calculate the established reward based on at least the user attribute and the evaluation coefficient that is associated with the attribute of the identified transaction object.

4. The reward calculation system according to claim 1, wherein the first processor is configured to store an evaluation coefficient in association with a combination of two or more transaction objects, wherein the first processor is configured to identify a combination of transaction objects from the receipt information, and is configured to calculate the established reward based on at least the user attribute and the evaluation coefficient that is associated with the combination of identified transaction objects.

5. The reward calculation system according to claim 1, wherein the first processor is configured to store an evaluation coefficient in association with a store attribute, wherein the first processor is configured to identify a store attribute from the receipt information, and is configured to calculate the established reward based on at least the user attribute and the evaluation coefficient that is associated with the store attribute identified.

6. The reward calculation system according to claim 1, wherein the first processor is configured to store a transmission history of the receipt image in the user terminal, wherein the first processor is configured to calculate the established reward based on at least the receipt information, the user attribute, and the transmission history.

7. The reward calculation system according to claim 1, wherein the first processor is configured to:

generate a quiz question by processing at least a part of the receipt image;

transmit the quiz question to a second user terminal used by a second user;

acquire, from the second user terminal, an answer to the quiz question, and wherein the first processor is configured to calculate an estimated quiz questioner reward potentially provided to the user, based on at least the payment information and a user attribute of the user.

8. The reward calculation system according to claim 7, wherein the first processor is configured to determine whether the answer is correct or incorrect, and to determine whether to give an answerer reward to the second user.

9. The reward calculation system according to claim 1, wherein the first processor is configured to train a learning model with learning data including the payment information and the user attribute as well as an established reward calculated in a past; and calculate the estimated reward with the use of the learning model.

10. The reward calculation system according to claim 1, wherein the first processor is configured to execute screen control of the user terminal to display the established reward.

11. The reward calculation system according to claim 1, wherein the system provides the established reward to the user.

12. A reward calculation method comprising:

executing, by a first computer, the steps of:

acquiring payment information about a completed payment of a transaction object traded on a user terminal comprising a second computer used by a user;

acquiring a user attribute of the user;

calculating an estimated reward potentially provided to the user, based on at least the payment information and the user attribute, wherein the estimated reward is a reward to be provided to the user if the user transmits a receipt image in which a receipt issued for the completed payment of the transaction object is displayed to the first computer;

causing the user terminal to display the calculated estimated reward after the payment information is acquired;

receiving, after the estimated reward is displayed, the receipt image from the user terminal;

acquiring receipt information included in the receipt image by analyzing text information included in the receipt image; and calculating an established reward to be provided to the user, based on at least the receipt information and the user attribute; and executing, by the second computer, the steps of:

executing a payment application;

displaying a graphical user interface comprising the calculated estimated reward and a first user operation button configured to activate a camera mounted on the user terminal to obtain the receipt image;

acquiring the receipt image in response to a user operation with the first user operation button;
displaying a graphical user interface comprising a second user operation button configured to cause the user terminal to transmit the receipt image to the first computer; and
transmitting the receipt image to the first computer in response to a user operation with the second user operation button.

* * * * *